(12) United States Patent
Watanabe et al.

(10) Patent No.: US 9,524,213 B2
(45) Date of Patent: Dec. 20, 2016

(54) STORAGE CONTROL APPARATUS, RECORDING MEDIUM HAVING STORED THEREIN STORAGE CONTROL PROGRAM AND STORAGE CONTROL METHOD

(71) Applicant: FUJITSU LIMITED, Kawasaki-shi, Kanagawa (JP)

(72) Inventors: Takeshi Watanabe, Kawasaki (JP); Kazuhiko Ikeuchi, Kawasaki (JP); Chikashi Maeda, Kawasaki (JP); Kazuhiro Urata, Kawasaki (JP); Yukari Tsuchiyama, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/660,983

(22) Filed: Mar. 18, 2015

(65) Prior Publication Data
US 2015/0278020 A1 Oct. 1, 2015

(30) Foreign Application Priority Data
Mar. 28, 2014 (JP) ................................ 2014-070146

(51) Int. Cl.
G06F 11/00 (2006.01)
G06F 11/10 (2006.01)

(52) U.S. Cl.
CPC ................................. *G06F 11/1092* (2013.01)

(58) Field of Classification Search
CPC .................................................. G06F 11/1092
See application file for complete search history.

(56) References Cited

U.S. PATENT DOCUMENTS 8,099,623 B1 1/2012 Li et al.
9,292,389 B2 * 3/2016 Schirripa ............ G06F 11/1402
(Continued)

FOREIGN PATENT DOCUMENTS

JP 2000-276305 10/2000
JP 2005-38271 2/2005
JP 2006-260446 9/2006

OTHER PUBLICATIONS

Holland, Mark et al., "Parity Declustering for Continuous Operation in Redundant Disk Arrays", Proceedings of the 2009 ACM SIGPLAN Conference on Programming Language Design and Implementation; Jun. 15-20, 2009,Dublin, Ireland, [ACM SIGPLAN Notices: A Monthly Publication of the Special Interest Group on Programming Languages of the AS, vol. 27, No. 9, Sep. 1, 1992, pp. 23-35, New York, US, XP0003305087.
(Continued)

*Primary Examiner* — Joseph Kudirka
(74) *Attorney, Agent, or Firm* — Fujitsu Patent Center

(57) ABSTRACT

A storage control apparatus starts, in a group of storage apparatuses that store constituent data that constitute redundant data in a distributed manner in units of a stripe, in regard to respective stripes of a plurality of stripes obtained from a group of target storage apparatuses excluding one of the storage apparatuses, a plurality of rebuilding processes for restoring the constituent data; decides, for each rebuilding process, a stripe for which the rebuilding process is to be performed next, according to access loads on the respective storage apparatuses of the group of target storage apparatuses; and obtains, for each rebuilding process, constituent data corresponding to the decided stripe from the group of target storage apparatuses and executing the rebuilding process, and executes the rebuilding process, to restore (Continued)

constituent data stored in the excluded storage apparatus from the obtained constituent data.

15 Claims, 22 Drawing Sheets

(56) References Cited

U.S. PATENT DOCUMENTS

| | | | |
|---|---|---|---|
| 2006/0123312 A1* | 6/2006 | Forhan | G06F 11/1092 714/758 |
| 2012/0079317 A1* | 3/2012 | Nelogal | G06F 11/1092 714/6.22 |
| 2014/0025990 A1 | 1/2014 | Akutsu et al. | |

OTHER PUBLICATIONS

Menon, Jai et al., "Distributed Sparing in Disk Arrays", Intellectual Leverage. San Francisco, Feb. 24-28, 1992;[Proceedings of the Computer Society International Conference (COMPCON) Spring], Los Alamitos, IEEE Comp. Soc. Press,, vol. Conf. 37, Feb. 24, 1992, pp. 410-421, XP010027175.

Extended European Search Report dated Aug. 19, 2015 for corresponding European Patent Application No. 15158996.7, 9 pages.

* cited by examiner

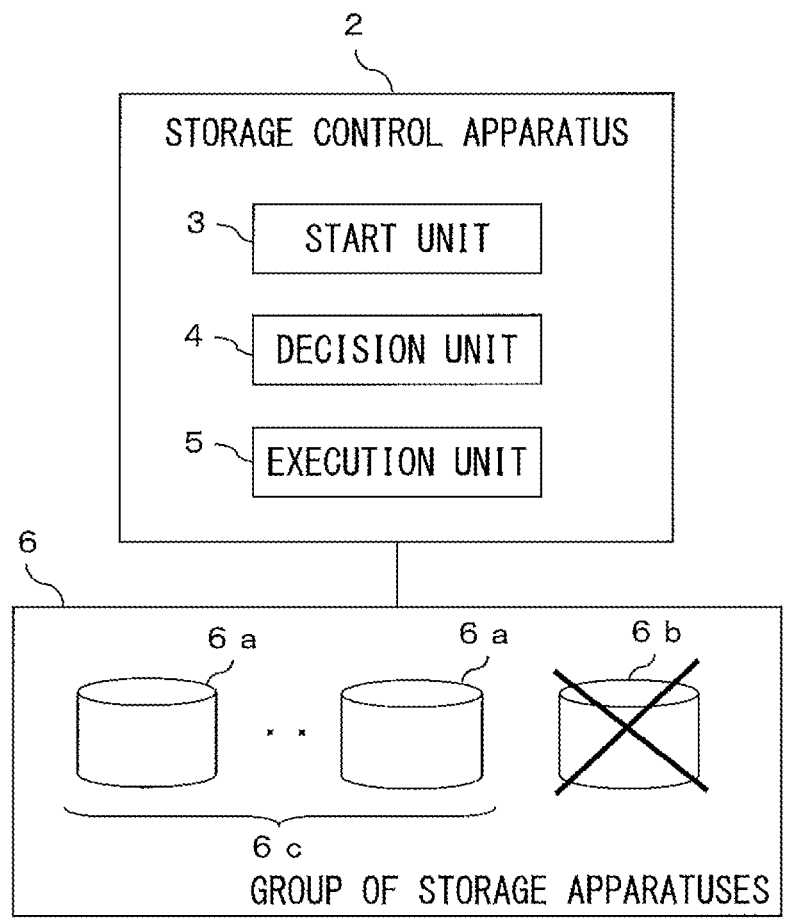
F I G. 1

| | Disk#0 | Disk#1 | Disk#2 | Disk#3 | Disk#4 | Disk#5 | Disk#6 |
|---|---|---|---|---|---|---|---|
| stripe#0 | 0 | 1 | P0 | 2 | 3 | P1 | HS0 |
| stripe#1 | 4 | 5 | P2 | 6 | 7 | P3 | HS1 |
| stripe#2 | 8 | 9 | P4 | 10 | 11 | P5 | HS2 |
| stripe#3 | 12 | 13 | P6 | 14 | 15 | P7 | HS3 |
| stripe#4 | 16 | 17 | P7 | 18 | 19 | P9 | HS4 |
| ⋮ | ⋮ | ⋮ | ⋮ | ⋮ | ⋮ | ⋮ | ⋮ |
| stripe#41 | 164 | 165 | P82 | 166 | 167 | P83 | HS41 |

FIG. 4

| | Disk#0 | Disk#1 | Disk#2 | Disk#3 | Disk#4 | Disk#5 | Disk#6 |
|---|---|---|---|---|---|---|---|
| stripe#0 | 0 | HS0 | P1 | 3 | 2 | P0 | 1 |
| stripe#1 | 5 | 4 | HS1 | P3 | 7 | 6 | P2 |
| stripe#2 | P4 | 9 | 8 | HS2 | P5 | 11 | 10 |
| stripe#3 | 14 | P6 | 13 | 12 | HS3 | P7 | 15 |
| stripe#4 | 19 | 18 | P8 | 17 | 16 | HS4 | P9 |
| ⋮ | ⋮ | ⋮ | ⋮ | ⋮ | ⋮ | ⋮ | ⋮ |
| stripe#41 | 165 | P82 | 166 | 167 | P83 | HS41 | 164 |

F I G. 5

| | Disk#0 | Disk#1 | Disk#2 | Disk#3 | Disk#4 | Disk#5 | Disk#6 |
|---|---|---|---|---|---|---|---|
| stripe#0 | Disk#0 | Disk#6 | Disk#5 | Disk#4 | Disk#3 | Disk#2 | Disk#1 |
| stripe#1 | Disk#1 | Disk#0 | Disk#6 | Disk#5 | Disk#4 | Disk#3 | Disk#2 |
| stripe#2 | Disk#2 | Disk#1 | Disk#0 | Disk#6 | Disk#5 | Disk#4 | Disk#3 |
| stripe#3 | Disk#3 | Disk#2 | Disk#1 | Disk#0 | Disk#6 | Disk#5 | Disk#4 |
| stripe#4 | Disk#4 | Disk#3 | Disk#2 | Disk#1 | Disk#0 | Disk#6 | Disk#5 |
| ... | ... | ... | ... | ... | ... | ... | ... |
| stripe#41 | ... | ... | ... | ... | ... | ... | ... |

10

F I G. 6

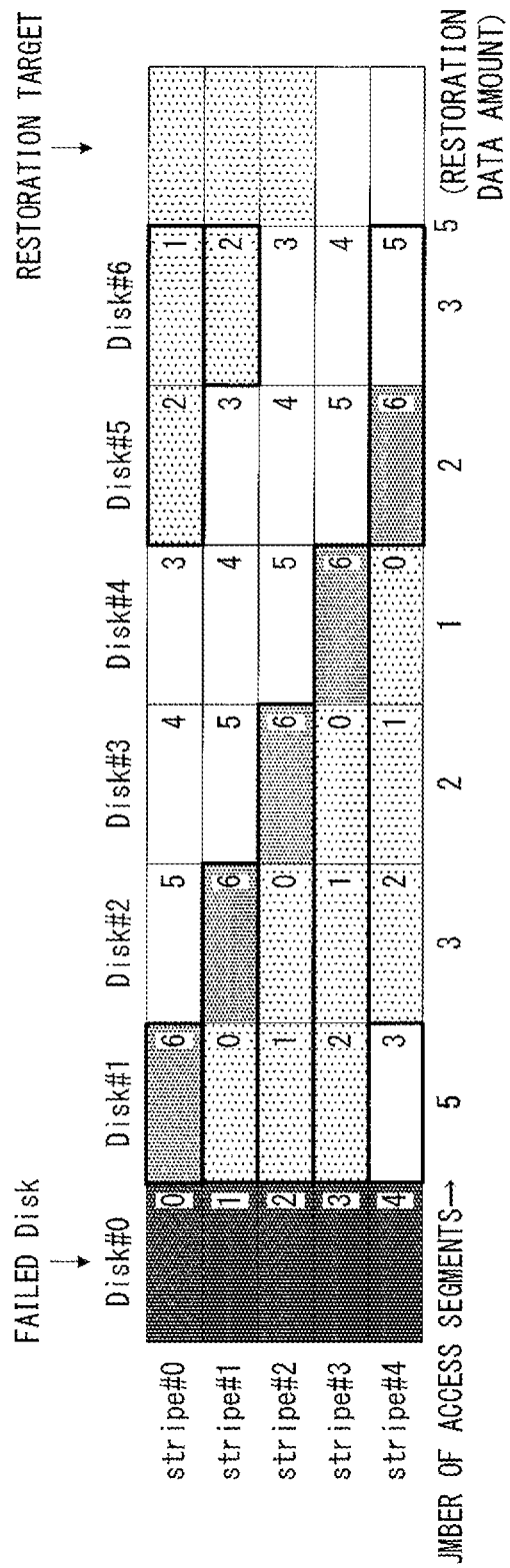
F I G. 7

|          | Disk#0 | Disk#1 | Disk#2 | Disk#3 | Disk#4 | Disk#5 | Disk#6 |
|----------|--------|--------|--------|--------|--------|--------|--------|
| stripe#0 | 0      | 1      | P0     | 2      | 3      | P1     | HS0    |
| stripe#1 | 4      | 5      | P2     | 6      | 7      | P3     | HS1    |

| | Disk#0 | Disk#1 | Disk#2 | Disk#3 | Disk#4 | Disk#5 | Disk#6 |
|---|---|---|---|---|---|---|---|
| stripe#0 | 0 | 1 | P0 | 2 | 3 | P1 | HS0 |
| stripe#1 | 4 | 5 | P2 | 6 | 7 | P3 | HS1 |

FIG. 10B

| | Disk#0 | Disk#1 | Disk#2 | Disk#3 | Disk#4 | Disk#5 | Disk#6 |
|---|---|---|---|---|---|---|---|
| stripe#0 | 0 | HS0 | P1 | 3 | 2 | P0 | 1 |
| stripe#1 | 5 | 4 | HS1 | P3 | 7 | 6 | P2 |

FIG. 11A

| | Disk#0 | Disk#1 | Disk#2 | Disk#3 | Disk#4 | Disk#5 | Disk#6 |
|---|---|---|---|---|---|---|---|
| stripe#0 | 0 | 1 | P0 | 2 | 3 | P1 | HS0 |
| stripe#1 | 4 | 5 | P2 | 6 | 7 | P3 | HS1 |

FIG. 11B

| | Disk#0 | Disk#1 | Disk#2 | Disk#3 | Disk#4 | Disk#5 | Disk#6 |
|---|---|---|---|---|---|---|---|
| stripe#0 | 0 | HS0 | P1 | 3 | 2 | P0 | 1 |
| stripe#1 | 5 | 4 | HS1 | P3 | 7 | 6 | P2 |

|          | Disk#0 | Disk#1 | Disk#2 | Disk#3 | Disk#4 | Disk#5 | Disk#6 |
|----------|--------|--------|--------|--------|--------|--------|--------|
| stripe#0 | 0      | 1      | P0     | 2      | 3      | P1     | HS0    |
| stripe#1 | 4      | 5      | P2     | 6      | 7      | P3     | HS1    |

F I G. 1 4 A

|          | Disk#0 | Disk#1 | Disk#2 | Disk#3 | Disk#4 | Disk#5 | Disk#6 |
|----------|--------|--------|--------|--------|--------|--------|--------|
| stripe#0 | 0      | HS0    | P1     | 3      | 2      | P0     | 1      |
| stripe#1 | 5      | 4      | HS1    | P3     | 7      | 6      | P2     |

F I G. 1 4 B

Mod(5) ADDITION

| + | 0 | 1 | 2 | 3 | 4 |  |
|---|---|---|---|---|---|---|
| 0 | 0 | 1 | 2 | 3 | 4 | SHIFT#0 |
| 1 | 1 | 2 | 3 | 4 | 0 | SHIFT#1 |
| 2 | 2 | 3 | 4 | 0 | 1 | SHIFT#2 |
| 3 | 3 | 4 | 0 | 1 | 2 | SHIFT#3 |
| 4 | 4 | 0 | 1 | 2 | 3 | SHIFT#4 |

FIG. 17A

Mod(5) INTEGRATION

| × | 0 | 1 | 2 | 3 | 4 |  |
|---|---|---|---|---|---|---|
| 0 | 0 | 0 | 0 | 0 | 0 | PATTERN#0 |
| 1 | 0 | 1 | 2 | 3 | 4 | PATTERN#1 |
| 2 | 0 | 2 | 4 | 1 | 3 | PATTERN#2 |
| 3 | 0 | 3 | 1 | 4 | 2 | PATTERN#3 |
| 4 | 0 | 4 | 3 | 2 | 1 | PATTERN#4 |

SHIFT#

FIG. 17B

|  | Disk # | | | | |
|---|---|---|---|---|---|
| STRIPE# | #0 | #1 | #2 | #3 | #4 |
| 0 | 0 | 4 | 8 | 12 | 16 |
| 1 | 20 | 24 | 28 | 32 | 36 |
| 2 | 40 | 44 | 48 | 52 | 56 |
| 3 | 60 | 64 | 68 | 72 | 76 |
| 4 | 5 | 9 | 13 | 17 | 1 |
| 5 | 29 | 33 | 37 | 21 | 25 |
| 6 | 53 | 57 | 41 | 45 | 49 |
| 7 | 77 | 61 | 65 | 69 | 73 |
| 8 | 10 | 14 | 18 | 2 | 6 |
| 9 | 38 | 22 | 26 | 30 | 34 |
| 10 | 46 | 50 | 54 | 58 | 42 |
| 11 | 74 | 78 | 62 | 66 | 70 |
| 12 | 15 | 19 | 3 | 7 | 11 |
| 13 | 27 | 31 | 35 | 39 | 23 |
| 14 | 59 | 43 | 47 | 51 | 55 |
| 15 | 71 | 75 | 79 | 63 | 67 |
| 16 |  | 0 | 5 | 10 | 15 |
| 17 |  | 38 | 20 | 27 | 29 |
| 18 |  | 53 | 59 | 40 | 46 |
| 19 |  | 71 | 74 | 77 | 60 |

F I G. 19

| STRIPE# | Disk # | | | | |
|---|---|---|---|---|---|
| | #0 | #1 | #2 | #3 | #4 |
| 0 | 0 | 4 | 3 | 2 | 1 |
| 1 | 5 | 4 | 5 | 7 | 6 |
| 2 | 10 | 9 | 8 | 10 | 11 |
| 3 | 15 | 14 | 13 | 12 | 15 |
| 4 | | 19 | 18 | 17 | 16 |
| 5 | 20 | 22 | 20 | 21 | 23 |
| 6 | 27 | 24 | 26 | 27 | 25 |
| 7 | 29 | 31 | 28 | 30 | 29 |
| 8 | | 33 | 35 | 32 | 34 |
| 9 | 38 | 38 | 37 | 39 | 36 |
| 10 | 40 | 43 | 41 | 40 | 42 |
| 11 | 46 | 44 | 47 | 45 | 46 |
| 12 | | 50 | 48 | 51 | 49 |
| 13 | 53 | 53 | 54 | 52 | 55 |
| 14 | 59 | 57 | 59 | 58 | 56 |
| 15 | 60 | 61 | 62 | 63 | 60 |
| 16 | | 64 | 65 | 66 | 67 |
| 17 | 71 | 71 | 68 | 69 | 70 |
| 18 | 74 | 75 | 74 | 72 | 73 |
| 19 | 77 | 78 | 79 | 77 | 76 |

FIG. 20

GF($2^2$) ADDITION

| + | 0 | 1 | $\alpha$ | $\alpha+1$ |
|---|---|---|---|---|
|  | 00 | 01 | 10 | 11 |
| 0 | 0 | 1 | $\alpha$ | $\alpha+1$ |
| 00 | 00 | 01 | 10 | 11 |
| 1 | 1 | 0 | $\alpha+1$ | $\alpha$ |
| 01 | 01 | 00 | 11 | 10 |
| $\alpha$ | $\alpha$ | $\alpha+1$ | 0 | 1 |
| 10 | 10 | 11 | 00 | 01 |
| $\alpha+1$ | $\alpha+1$ | $\alpha$ | 1 | 0 |
| 11 | 11 | 10 | 01 | 00 |

PRIMITIVE POLYNOMIAL: $\alpha^2+\alpha+1$ from $\alpha^2=\alpha+1$

FIG. 21A

GF($2^2$) INTEGRATION

| + | 0 | 1 | $\alpha$ | $\alpha+1$ |
|---|---|---|---|---|
|  | 00 | 01 | 10 | 11 |
| 0 | 0 | 0 | 0 | 0 |
| 00 | 00 | 00 | 00 | 00 |
| 1 | 0 | 1 | $\alpha$ | $\alpha+1$ |
| 01 | 00 | 01 | 10 | 11 |
| $\alpha$ | 0 | $\alpha$ | $\alpha+1$ | 1 |
| 10 | 00 | 10 | 11 | 01 |
| $\alpha+1$ | 0 | $\alpha+1$ | 1 | $\alpha$ |
| 11 | 00 | 11 | 01 | 10 |

PRIMITIVE POLYNOMIAL: $\alpha^2+\alpha+1$ from $\alpha^2=\alpha+1$

FIG. 21B

GF (2²) ADDITION

| + | 0 | 1 | 2 | 3 | |
|---|---|---|---|---|---|
| 0 | 0 | 1 | 2 | 3 | SHIFT#0 |
| 1 | 1 | 0 | 3 | 2 | SHIFT#1 |
| 2 | 2 | 3 | 0 | 1 | SHIFT#2 |
| 3 | 3 | 2 | 1 | 0 | SHIFT#3 |

F I G.  2 2 A

GF (2²) INTEGRATION

| + | 0 | 1 | 2 | 3 | |
|---|---|---|---|---|---|
| 0 | 0 | 0 | 0 | 0 | PATTERN#0 |
| 1 | 0 | 1 | 2 | 3 | PATTERN#1 |
| 2 | 0 | 2 | 3 | 1 | PATTERN#2 |
| 3 | 0 | 3 | 1 | 2 | PATTERN#3 |

F I G.  2 2 B

STORAGE CONTROL APPARATUS, RECORDING MEDIUM HAVING STORED THEREIN STORAGE CONTROL PROGRAM AND STORAGE CONTROL METHOD

CROSS-REFERENCE TO RELATED APPLICATIONS

This application is based upon and claims the benefit of priority of the prior Japanese Patent Application No. 2014-070146, filed on Mar. 28, 2014, the entire contents of which are incorporated herein by reference.

FIELD

The present invention relates to a storage control apparatus.

BACKGROUND

For storage apparatuses, the Redundant Array of Inexpensive Disks (RAID) techniques is used to assure performance and fault resistance by distributing data into a plurality of hard disks (magnetic disk apparatuses). Storage apparatuses realize the RAID techniques which includes data allocation to the disks and making data redundant (multiplexing), and so on, using the RAID controller.

There are recovery techniques called rebuild with which, when a disk belonging to a RAID group fails, data on the failed disk are restored using redundancy of data that have been made redundant. Such recovery techniques include, for example, the techniques described below.

As the first technique, there is the following technique (for example, Patent document 1). A load measuring means measures the busy rates of respective disk apparatuses. The load control means commands the start and stop of the recovering process according to the busy rates. A recovering process means stops the recovering process when the frequency of usage of the recovery source or the recovery destination by the host apparatus is high, and resumes the recovering process when the frequency of accesses from the host apparatuses falls below a certain frequency. As a result, it becomes possible to perform the recovering process without making the input/output (I/O) speed of the host decrease.

As a second technique, there is the following technique (for example, Patent document 2). In a disk array apparatus equipped with two types of parity data and a plurality of data recovery systems, in the case of a failure of a single magnetic disk, a data recovery system with which a degenerated magnetic disk and a magnetic disk with the maximum load may be excluded from the use in the data recovering process is selected. Accordingly, when a failure occurs in a magnetic disk on the disk array apparatus, it becomes possible to reduce delay in the data recovering process due to access load on other magnetic disks.

As the third technique, there is a technique (for example, Patent document 3) in which, in a disk array apparatus with 2-parity configuration, the parity used and data of the recovery source are rotated at the time of read in the case of a correction for failure of one HDD.

Patent document 1: Japanese Laid-open Patent Publication No. 2000-276305
Patent document 2: Japanese Laid-open Patent Publication No. 2005-38271
Patent document 3: Japanese Laid-open Patent Publication No. 2006-260446

SUMMARY

A storage control apparatus includes a start unit, a decision unit, and an execution unit. The start unit starts, in a group of storage apparatuses that store the constituent in a distributed manner in units of a stripe, in regard to respective stripes of a plurality of stripes obtained from a group of target storage apparatuses excluding one of the storage apparatuses, a plurality of rebuilding processes for restoring the constituent data. The stripe is a unit in which the constituent data that constitute redundant data are stored in parallel in respective storage apparatuses of the group of storage apparatuses. The decision unit decides, for each rebuilding process, a stripe for which the rebuilding process is to be performed next, according to access loads on the respective storage apparatuses of the group of target storage apparatuses. The execution unit and obtains, for each rebuilding process, constituent data corresponding to the decided stripe from the group of target storage apparatuses, and executing the rebuilding process, and executes the rebuilding process, to restore constituent data stored in the excluded storage apparatus from the obtained constituent data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an example of a block diagram of a storage system in this embodiment;

FIG. 4 illustrates a data arrangement example in a case in which Redundant sets#0, #1 are respectively stored in a concentrated manner in Disk #0 through Disk #2 or disk #3 through Disk#5 with respect to a RAID group;

FIG. 5 illustrates a data arrangement example in a case in which redundant sets and HS areas are arranged in a distributed manner in units of a stripe;

FIG. 6 illustrates an example of a conversion table in the embodiment;

FIG. 7 is a diagram for explaining the deviation in the number of access segments in the respective disks in a case in which a plurality of stripes are rebuilt at the same time;

FIG. 9 illustrates the configuration of a redundant set and an example of the arrangement of the redundant set and the HS area;

FIG. 10A and FIG. 10B are diagrams for explaining decision of the disk for which READ is to be performed according to a conversion table in the present embodiment;

FIG. 11A and FIG. 11B are diagrams for explaining decision of the disk for which WRITE is to be performed according to a conversion table in the embodiment;

FIG. 14A and FIG. 14B are diagrams for explaining decision of the disk for which READ is to be performed according to a conversion table in the case of READ for restoration in the embodiment;

FIG. 17A and FIG. 17B are diagrams (1) for explaining distributed arrangement according to Galois field in the embodiment;

FIG. 19 is a diagram (3) for explaining distributed arrangement according to Galois field in the embodiment;

FIG. 20 is a diagram (4) for explaining distributed arrangement according to Galois field in the embodiment;

FIG. 21A and FIG. 21B are diagrams (1) for explaining distributed arrangement according to Galois extension field in the embodiment; and FIG. 22A and FIG. 22B are diagrams (2) for explaining distributed arrangement according to Galois extension field in the embodiment.

DESCRIPTION OF EMBODIMENTS

Figure 2B:
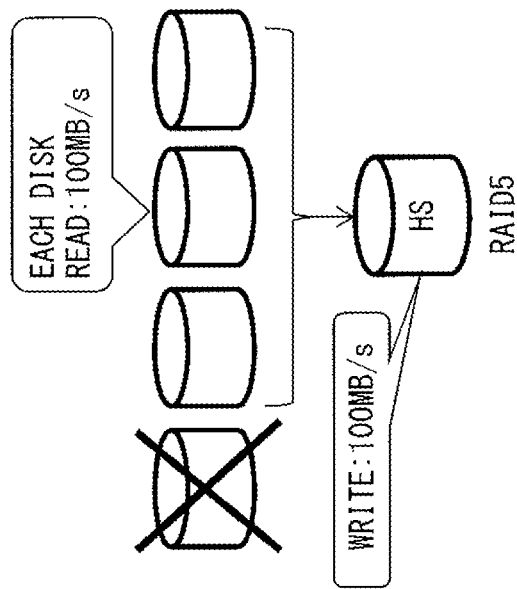
FIG. 2A and FIG. 2B illustrate an example of a rebuild technique.

As an aspect, this embodiment provides a technique for speeding up the rebuilding process in executing a plurality of data rebuilding processes in storage apparatuses in which data are stored in a distributed manner into a group of storage apparatuses.

A storage system includes a RAID group that is a set of disks that form a RAID. Reading/writing of data while allocating data of a certain unit length to each disk of the RAID group is called "striping". In addition, the data blocks allocated to the respective disks by striping become a target of one read or one write, and a set of data blocks that are read and written in parallel from the respective disks of the RAID group is called a "stripe".

In recent years, the capacity of disk apparatuses (hereinafter, referred to as "disks") has been increasing, and the time taken to complete restoration of data of one disk by a rebuild has been increasing significantly. For this reason, there has been an increasing demand for a higher speed for the rebuild.

For a higher speed for the rebuild, distributing data that have been made redundant and a hot spare (HS) area into the respective stripes may be considered.

When a rebuild is executed in a case in which one of the disks of the RAID group fails, data in other disks are read, the data that had been held by the failed disk are restored, and the restored data are written into the HS area. Therefore, it follows that, at the time of a rebuild, an access load for a READ access or a WRITE access is put on each disk.

However, even though the redundant data and the HS areas are distributed into the respective stripes, when rebuild processes are performed simultaneously for a plurality of stripes, the access load may concentrate on one of the disks. As a result, there is a risk that the disk with the high access load becomes a bottleneck and the throughput of the rebuild may deteriorate.

As an aspect, the embodiment provides a technique for speeding up the rebuilding process in a case in which a plurality of rebuilding processes for data are performed in a storage system in which data are arranged in a distributed manner into a group of storage apparatuses.

FIG. 1 is an example of a block diagram of a storage system in the embodiment. A storage system 1 includes a storage control apparatus 2 and a group of storage apparatuses 6. The storage control apparatus 2 includes a start unit 3, a decision unit 4, and an execution unit 5. An example of the storage control apparatus 2 is a CM 12.

The start unit 3 starts a plurality of rebuilding processes for restoring constituent data, for the respective stripes of a plurality of stripes obtained from a group of target storage apparatuses 6c in the group of storage apparatuses 6 in which the constituent data are stored in a distributed manner in units of a stripe, except one of the storage apparatuses, namely a storage apparatus 6b. The stripe is a unit in which the respective constituent data that constitute redundant data are stored in parallel in the respective storage apparatuses 6a, 6b in the group of storage apparatuses 6. An example of the start unit 3 is a CPU 14 that functions as a rebuild control unit 16.

The decision unit 4 decides, for each rebuilding process, the stripe for which the rebuilding process is to be performed next, according to the access loads on the respective storage apparatuses 6a in the group of target storage apparatuses 6c. An example of the decision unit 4 is the CPU 14 that functions as the rebuild control unit 16.

The execution unit 5 obtains, for each rebuilding process, the constituent data corresponding to the decided stripe from the group of target storage apparatuses 6c, and executes a rebuilding process, to restore the constituent data stored in the excluded storage apparatus 6b from the obtained constituent data.

According to the configuration as described above, in a storage apparatus in which data are stored in a distributed manner into a group of storage apparatuses, it becomes possible to speedup the rebuilding process in a case in which a plurality of rebuilding process for data are executed. That is, it becomes possible to level the access loads on the respective disks at the time of the rebuild in the storage system, to speed up the rebuild.

The decision unit 4 decides, for each rebuilding process, the stripe for which the rebuild process is to be performed next, according to the access loads on the storage apparatuses 6a calculated according to the number of accesses to the respective the storage apparatuses 6a in the group of target storage apparatuses 6c. For example, the decision unit 4 calculates, for each rebuilding process, the distribution value or the standard deviation of the number of accesses to the group of target storage apparatuses 6c, based on the number of the accesses to the respective storage apparatuses 6a included in the group of target storage apparatuses 6c. The decision unit 4 decides, for each rebuilding process, the stripe for which the rebuild process is to be performed next, according to the calculated distribution value or the standard deviation.

According to the configuration as described above, it becomes possible to dynamically decide the stripe to be the target of the next rebuild process so that the access load on the disks in each rebuild process becomes even.

Meanwhile, the respective storage apparatuses 6a, 6b include a first area for storing constituent data corresponding to a stripe, or a second area to be used when restoring redundant data corresponding to a stripe. The first area and the second area are held in the respective storage apparatuses 6a, 6b of the group of storage apparatuses 6 in a distributed manner into the respective stripes, according to storage destination identification information. The storage destination identification information is information that identifies the storage apparatuses 6a, 6b for actual storage, from the logical combination of the stripe and the storage apparatuses 6a, 6b. For example, the storage destination identification information is created based on the Galois theory or the Galois extension theory. An example of storage destination identification information is a conversion table 10.

According to the configuration described above, it becomes possible to arrange data in an effectively-distributed manner into the respective disks that constitute the RAID group.

Hereinafter, the embodiment is explained using more specific examples.

Figure 2A:
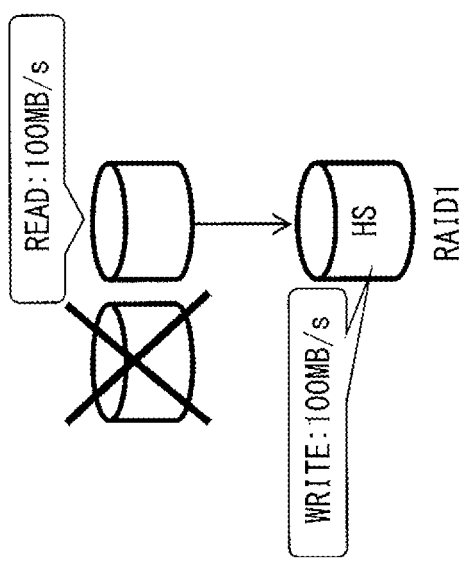

As an example of the rebuild techniques, there is a rebuild technique illustrated in FIG. 2A and FIG. 2B. FIG. 2A is a diagram for explaining the rebuild in a case in which one of two mirrored disks fails in RAID1. FIG. 2B is a diagram for explaining the rebuild in a case in which one of the disks fails in RAID5.

However, with the rebuild technique in FIG. 2A and FIG. 2B, it is impossible in principle to expect any performance as a throughput that is equivalent to or better than the throughput of one disk apparatus. For example, as illustrated in FIG. 2, both READ and WRITE for the disk become a bottle neck in the case of the rebuild in RAID1. With both READ and WRITE, it is impossible to expect any performance improvement to realize a throughput that is more than the throughput of one disk, because data are read from one disk and the data are written into one disk.

Meanwhile, as illustrated in FIG. 2B, in the case of RAID5, WRITE becomes a bottleneck because there is one disk as the disk for WRITE of data. In addition, in FIG. 2B, it seems that it is possible to perform READ in parallel from the three disks as disks for READ, but to restore data of 100 MB (MegaByte), it is necessary to perform READ for data of 100 MB from each of the three disks, that is, 300 MB in total. Therefore, in order to perform WRITE at 100 MB/s, it is necessary to perform READ at 100 MB/s in terms of each disk.

Assuming that the throughput of the disk does not improve significantly as described above, it is impossible to break the wall of the throughput of one disk with extension of the control of the rebuild described above. Therefore, it is impossible to expect any performance improvement to realize a throughput that is more than the throughput of one disk.

Figure 3:
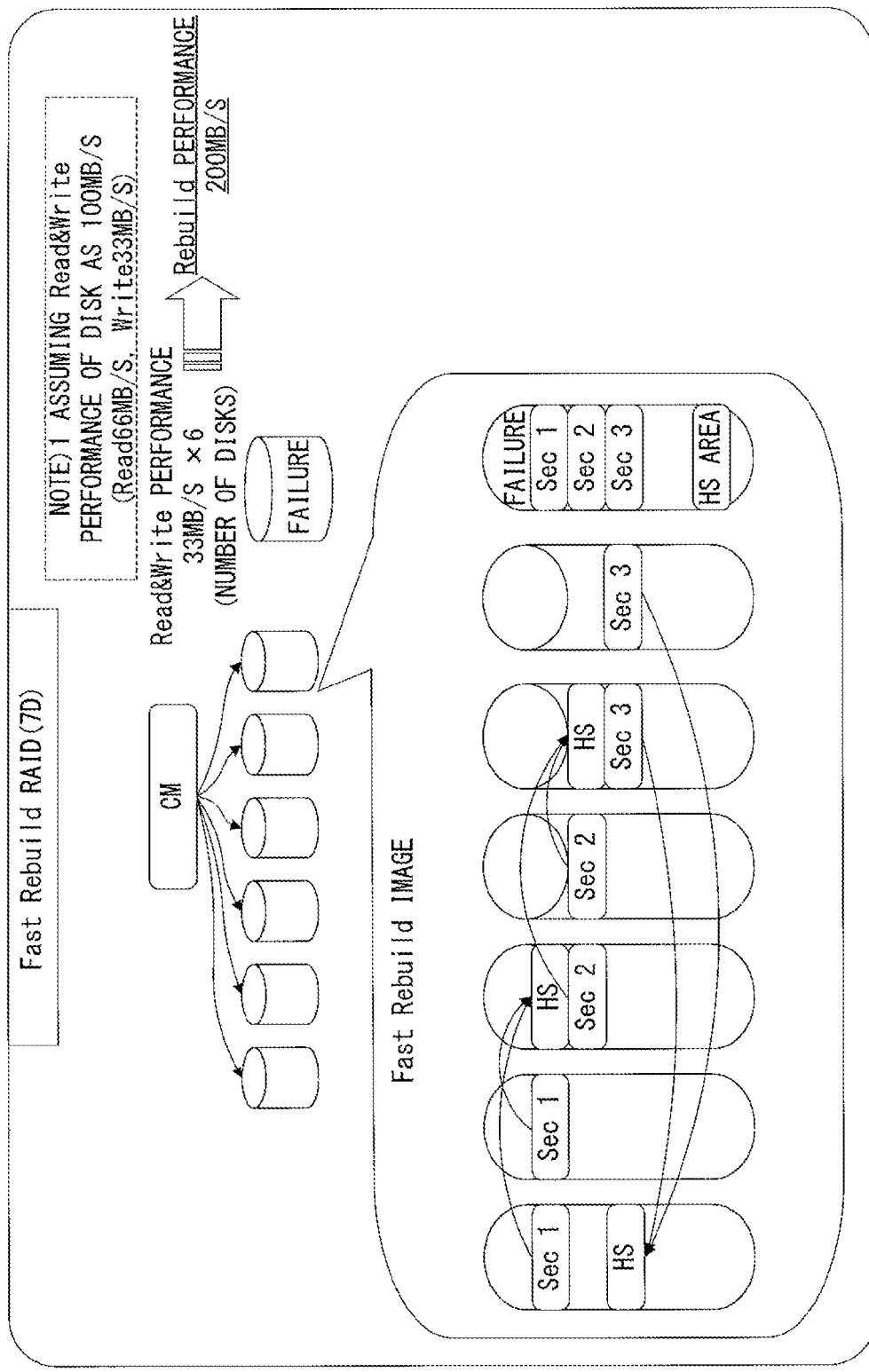
FIG. 3 is an example of a fast rebuild technique.

In order for a several-fold reduction in the rebuild time compared with the rebuild in FIG. 2A and FIG. 2B, it is necessary to perform READ/WRITE in parallel from a plurality of disks in the control of the rebuild. Therefore, a method for speeding up the rebuild as illustrated in FIG. 3 may be considered. It is assumed that the READ performance and the WRITE performance of each disk in the case in which data are not arranged in a distributed manner are respectively 100 MB/s.

FIG. 3 is an example of a fast rebuild technique. The rebuild technique in FIG. 3 is a technique for distributing data and a hot spare (HS) area in a plurality of RAID groups into a large number of disks in a prescribed unit size. Hereinafter, data in a prescribed unit size is called a "data segment" or a "segment".

The HS area is an area that stores the restored data segment, when the data segment stored in a failed disk is restored. By distributing the data segments and the HS areas as described above, it becomes possible to increase disks that participate in READ/WRITE for the rebuild when one disk fails.

FIG. 3 illustrates an example of distributing RAID5 (2+1) into seven disks. Here, the description RAID5 (2+1) indicates a data structure in which, in RAID5, one parity exists for two distributed data segments (hereinafter, referred to as a redundant data set or a redundant set). Meanwhile, it is assumed that the READ performance and the WRITE performance of each disk in the case in which data are not arranged in a distributed manner are respectively 100 MB/s.

When the redundant sets RAID5 (2+1) are distributed evenly into a plurality of disks that form the RAID group, "data area:HS area=2:1" holds true for each disk. In this case, "READ performance: WRITE performance=2:1", because two data segments are read to restore (rebuild) the missing data, and the restored data is written into one HS area. There, READ performance of each disk is $100\times(2/3)$ #≅66 MB/s, and WRITE performance is $100\times(1/3)$≅33 MB/s. Therefore, when one of seven disks fails and a rebuilt is executed, the READ and WRITE performances of each disk may be regarded as 33 MB/s because, of READ and WRITE, WRITE becomes a bottleneck. In this case, the rebuild performance of the entire RAID5 group is 33 MB/s×6 (the number of disks)≅200 MB/s.

Thus, when the number of disks that constitute the RAID increases, it becomes possible to speed up the rebuild. For example, the rebuild performance is 600 MB/s with 19 disks. Therefore, the data arrangement in the disks that constitute the RAID is considered as an important element in improving rebuild performance. Then, data arrangement in a RAID group is discussed with the examples in FIG. 4 and FIG. 5.

FIG. 4 illustrates a data arrangement example in a case in which Redundant sets#0, #1 are respectively stored in a concentrated manner in Disk #0 through Disk #2 or Disk#3 through Disk#5 with respect to a RAID group.

In FIG. 4, Disk#0 through Disk#2 (Redundant set#0) and Disk#3 through Disk#5 (Redundant set#1) respectively constitute RAID5 (2+1). Disk#6 is a hot spare disk for Redundant set#0 and Redundant set#1.

In FIG. 4, the number indicated in each segment represents the order of assignment of data. Px (x: integer) is a parity for assuring consistency between the two pieces of data immediately before Px in the same stripe. Meanwhile, each segment in FIG. 4 is formed in the size of 128LBA (Logical Block Addressing).

FIG. 5 illustrates a data arrangement example in a case in which redundant sets and HS areas are arranged in a distributed manner in units of a stripe. In FIG. 5, the data arrangement illustrated in FIG. 4 is arranged in a distributed manner in units of a stripe. This makes it possible to constitute data arrangement for a fast rebuild.

Meanwhile, the conversion from the data arrangement in FIG. 4 into the distributed data arrangement in FIG. 5 is performed according to a conversion table illustrated in FIG. 6. Meanwhile, in FIG. 5, the segments that constitute a redundant set in each stripe are arranged successively in adjacent disks, but this is not a limitation. That is, the segments that constitute a redundant set in each stripe do not have to be arranged successively in adjacent disks. That is, the segments that constitute a redundant set in each stripe may be dispersed in a stripe according to the conversion table or in an arbitrary way.

FIG. 6 illustrates an example of a conversion table in the embodiment. The disk No. in the RAID arrangement in FIG. 4 corresponds to the column (Disk#) in the conversion table 10, and the stripe No. corresponds to the line (stripe#) in the conversion table 10. The value stored in the cell at which the column and the line intersect corresponds to the disk No. in the same stripe in FIG. 5. Therefore, Disk#1, stripe#0 in FIG. 4 is converted into Disk#5 in the same stripe#0 according to the conversion table 10, as illustrated in FIG. 5.

The conversion table 10 is a table created in advance according to the theory of Galois extension field, as described later. The conversion table 10 is created so that the loads on the respective disks for rebuild become the same in the range of the prescribed number of stripes regardless of which of the disks fails, according to the theory of Galois extension field. The prescribed number of stripes is decided by the number of disks that constitute the RAID group. For example, it is 42 stripes when RAID5 (2+1)×2 and HS×1 are distributed into 7 disks.

The distributed data arrangement for speeding up the rebuild is a data arrangement with which READ/WRITE loads on each disk at the time of execution of the rebuild due to a disk failure become even in the prescribed range of stripes (for example, 42 stripes in the seven-disk configuration).

In the actual operation of the rebuild, the 42 stripes are not restored at the same time, and in consideration of the load on the disks, actual processing is applied to several stripes at a time. For example, as the rebuild operation, processing may be sequentially applied to several stripes at a time, from the first stripe.

However, in the actual operation of a rebuild, there is a deviation in the disk loads depending on the combination of stripes being processed. This is explained using FIG. 7.

FIG. 7 is a diagram for explaining the deviation in the number of access segments for the respective disks in a case in which a plurality of stripes are rebuilt at the same time. For example, in FIG. 7, assuming that rebuild processes are currently performed for five stripes (stripes#0 through #4) while Disk#0 is the failed disk, the respective segments to which READ/WRITE accesses are performed are the portion in the thick frame in FIG. 7.

In each stripe at the time of the rebuild, READ is performed for the data and parity of the redundant set to which the segment that is the target of the restoration belongs, and WRITE into the storage-destination HS area is performed for the restored data. For this reason, the segment of the data and parity of the same redundant set as the restoration-target segment becomes the target of READ. The segment of HS becomes the target of WRITE. Calculating the number of access segments accordingly, the number of access segments in each disk is 5 for Disk#1, 3 for Disk#2, 2 for Disk#3, 1 for Disk#4, 2 for Disk#5, and 3 for Disk#6. Thus, in Disk#1 through Disk#6, there is a deviation in the number of disk accesses, from 1 segment access to 5 segment accesses.

Therefore, in the distributed data arrangement for speeding up the rebuild, in a case in which data restoration is executed for several stripes at a time from the first one assuming the actual operation of the rebuild, there is a deviation in the disk access loads in the processes applied to the several stripes each time. As a result, the disk with a high access load becomes a bottleneck and the throughput of the rebuild decreases.

Therefore, in the embodiment, in the RAID configuration in which the redundant sets and the HS area are arranged in a distributed manner into the respective disks that constitute the RAID group, when simultaneously performing a rebuild process for a plurality of stripes, the following process is executed in each rebuild process. That is, in a rebuild process for a stripe, in consideration of the rebuild process for other stripes, the amount of load on each disk at the current point in time is calculated, and an unprocessed stripe with which the load on each disk may be balanced is selected as the next processing-target stripe, and then the rebuild is executed.

Accordingly, the loads on the respective disks are dynamically distributed in the rebuild process. It becomes possible to efficiently utilize the throughput of each disk by the dispersion of the loads on the disks, and the processing speed for the rebuild is improved.

The embodiment is explained in greater detail.

Figure 8:
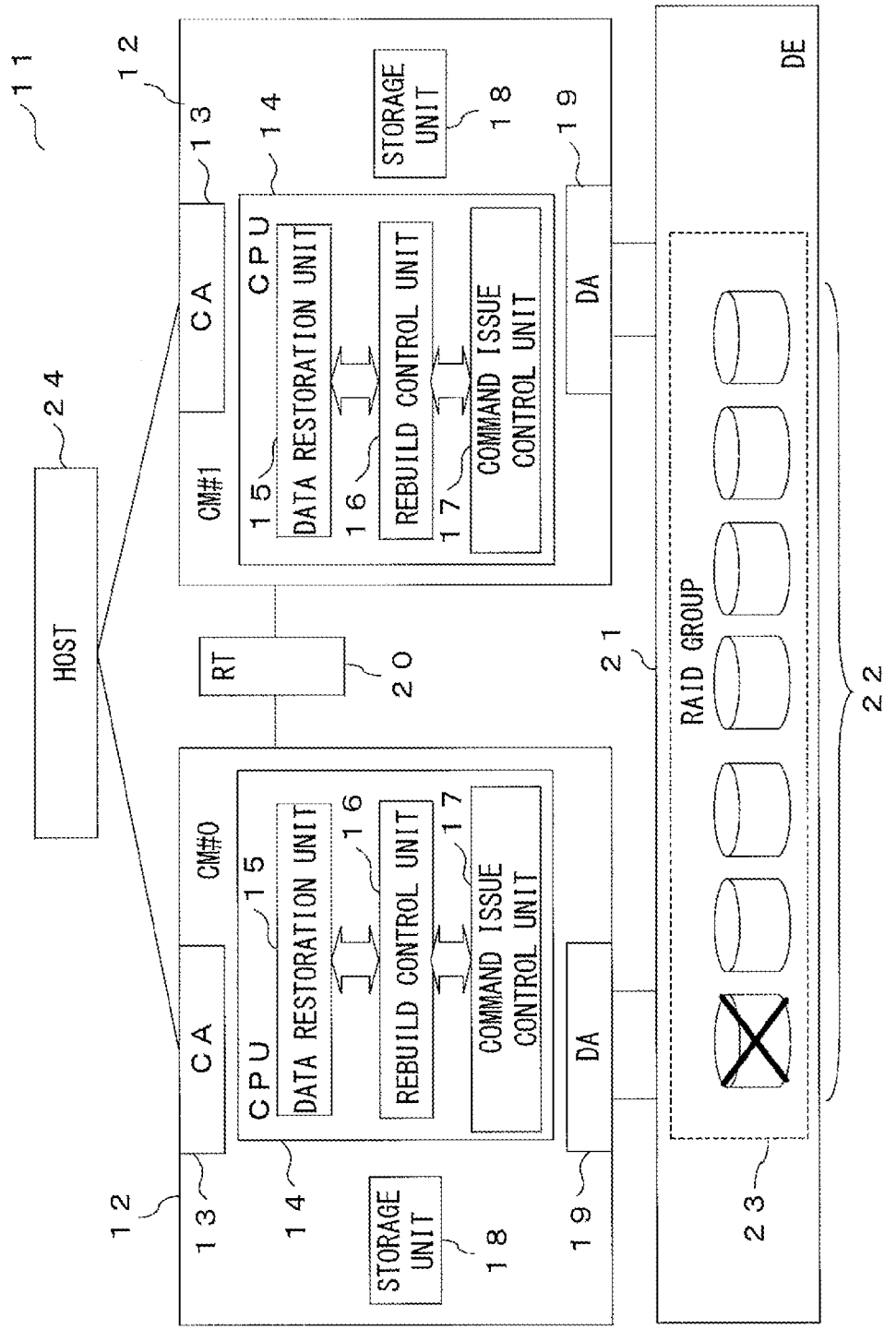
FIG. 8 illustrates an example of a storage system in the embodiment.

FIG. 8 illustrates an example of the storage system in the embodiment. A storage system 11 is a disk storage system equipped with a plurality of disks 22. In regard to the access from a host computer (hereinafter, referred to as the host) 24 to the disks 22, in order to make it redundant, two access paths exist for each of the disks 22. In addition, in regard to data themselves, the data are distributed into a plurality of disks using the RAID technique and stored in a state in which the data are made redundant.

The storage system 11 includes the host computer (hereinafter, referred to as the host) 24, two controller modules (CM) 12, and a drive enclosure (DE) 21. In the storage system 11, the DE 21 and the host 24 are connected via the CMs 12.

The host 24 communicates with the CM 12 to read data from the disk 22 of the DE 21 and to write data into the disk 22. Meanwhile, FIG. 8 presents one host 24, but a plurality of hosts 24 may be connected to each CM 12.

Each CM 12 controls the operation of the disk 22. Each CM 12 functions as a storage control apparatus. The storage system 11 secures redundancy of the storage control apparatus by having two or more CMs 12.

The CM 12 transmits an input/output (I/O) command as access instruction information to the DE 21, to issue data input/output orders for the storage area of the disk 22. In addition, when no response is obtained after an access monitoring time has elapsed after the input/output order, the CM 12 transmits an abort instruction command to the DE 21 to abort the I/O process.

The CM 12 includes a channel adaptor (CA) 13, a Central Processing Unit (CPU) 14, a storage unit 18, and a device adaptor (DA) 19. The CA 13, the CPU 14, the storage unit 18, and the DA 19 are connected via an internal bus.

The CA 13 is a component that controls the respective SCSI (Small Computer System Interface) ports that are an interface (I/F) with the host 24. The CPU 14 controls the entirety of the CM 12.

The storage unit 18 is a device such as a cache memory, a ROM (Read Only Memory), a RAM (Random Access Memory), or the like that records information. The storage unit 18 stores data used for making the CM 12 operate, a program according to the embodiment, the conversion table 10, and data used in the embodiment, and so on.

The conversion table 10 is a conversion table that uses Galois extension field explained in FIG. 6, but this is not a limitation. That is, the conversion table may be any table in which, for each stripe, the logical segment arrangement and the physical segment arrangement are associated, in order to distribute the data segments and the HS areas into the respective disks of the RAID group. For example, the conversion table 10 may be anything that has a mechanism with which the stripe# and the disk# to be the destination of the actual arrangement of the segment may be uniquely determined from the logical stripe# and the disk#.

The DA 19 is an interface for connection with the DE 21, and it is duplicated and connected with the DE 21. The CPU 14 performs data transmission and reception with the DE 21 via the DA 19.

The route (RT) 20 is a route for the communication between CMs 12.

The DE 21 is a component that stores a plurality of disks 22 and that has a RAID configuration in consideration of redundancy. Meanwhile, the disk 22 is not limited to a hard disk drive (HDD), and for example, it may be an SSD (Solid State Drive), a magneto-optical disk, or the like. In addition, while the disk 22 is used as an example of the storage apparatus in the embodiment, this is not a limitation, and any storage apparatus with which both the random access and the sequential access methods are available will do.

A RAID group 23 is a set of disks 22 in which data arrangement is made for realizing a fast rebuild. As a data arrangement for a fast rebuild, redundant data (for RAID5, RAID5+0) that are striped across the RAID group and a HS area corresponding to the hot spare for one unit are arranged in a distributed manner into the respective disk 22 that constitute the RAID group.

The CPU 14 functions as a data restoration unit 15, a rebuild control unit 16, and a command issue control unit 17. The data restoration unit 15 performs data restoration by calculating exclusive OR (XOR) of data obtained by READ from a plurality of disks 22 in the respective processes of a rebuild. The rebuild control unit 16 decides the start and the end of a rebuild, or the process range of the next process of a rebuild. The command issue control unit 17 controls the issuance of commands to the respective disks 22. In addition, the command issue control unit 17 measures the number of READ commands and the number of WRITE commands issued to the respective disks 22 (the number of READ/WRITE accesses) and stores the measured number in the storage unit 18.

Next, specific operations of the CM 12 are explained.

When the operations of RAID creation and volume creation are performed in this order according to an instruction from the user, a data arrangement that enables a fast rebuild is created, and it becomes possible to accept the host I/O. After that, a rebuild operation starts when one of disks that constitute the RAID fails.

(1) RAID Creation

The RAID in which a distributed data arrangement that enables a fast rebuild is to be made is defined as a new RAID type. The new RAID type is referred to as a RAID5-FR (FR: Fast Rebuild). When the user specifies the RAID5-FR as the RAID type, selects disks that are to constitute the RAID group and issues a creation instruction, a RAID group that enables a fast rebuild is created.

At the point in time when the RAID group is created, the CM 12 combines the new RAID type and the disks to constitute the RAID group, and creates on the storage unit 18 a table of constituent data regarding the RAID. Meanwhile, at this point in time, data arrangement in FIG. 5 has not been made on the disks 22 yet.

(2) Volume Creation

When the user specifies the volume size with respect to the RAID group created in (1) above and issues a volume creation instruction, a volume formatting is executed according to the specified volume size in the CM 12.

As the operation of the volume format, a check code is attached to each LBA, and 0 data is written into each segment for data, based on the data arrangement in FIG. 5. Here, the check code is information for ensuring validity of data of the LBA.

The segment for parity is generated by calculating XOR of segments for data on the redundant set to which the segment for parity belongs in the stripe to which the segment for parity belongs. Here, the configuration of the redundant set is explained using FIG. 9.

FIG. 9 illustrates the configuration of a redundant set and an example of the arrangement of the redundant set and the HS area in the embodiment. For example, for the stripe#0 in FIG. 9, a segment P0 for parity is generated by calculating XOR of segments for data 0, 1 on the redundant set to which the segment for parity belongs in the stripe to which the segment for parity belongs. In a similar manner, a segment P1 for parity is generated by calculating XOR of segments for data 2, 3 on the redundant set to which the segment for parity belongs in the stripe to which the segment for parity belongs.

In the segment for HS, nothing is written at the time of the volume format. In the casein FIG. 9, nothing is written in HS0 and HS1 at the point in time.

(3) Host I/O

When a distributed data arrangement for a fast rebuild is made by volume creation, it becomes possible for the CM 12 to accept input/output (I/O) accesses from the host 24 to the disk 22.

In regard to READ/WRITE accesses from the host 24, the CM 12 executes the following. The CM 12 first calculates the stripe range of the access destination from the logical LBA of the access destination of the input/output access from the host 24, to decide segments for which READ/WRITE is to be performed in the logical data arrangement in each stripe. Here, the logical data arrangement is a logical data arrangement before physical arrangement is made in the RAID according to the conversion table 10, and it corresponds to a logically-formed data arrangement in which redundant sets are arranged in parallel in a concentrated manner as illustrated in FIG. 4, for example.

The CM 12 decides the disk 22 for which actual READ/WRITE is to be performed, according to the conversion table 10 and according to the segments for which READ/WRITE is to be performed on the logical data arrangement of each stripe, and performs READ/WRITE for the data segments in the decided disk 22.

FIG. 10A and FIG. 10B are diagrams for explaining decision of the disk for which READ is to be performed according to a conversion table in the embodiment. FIG. 10A illustrates a logical data arrangement example in units of a stripe before conversion according to the conversion table 10. FIG. 10B illustrates a physical data arrangement example in units of a stripe after conversion according to the conversion table 10. In this example, it is assumed that the range of the READ access from the host 24 is 0 through 512 LBA, and segments for which READ is performed are segments 0, 1, 2, 3.

The CM 12 first calculates the stripe range from the logical LBA (0 through 512 LBA) of the input/output from the host 24, and decides the segments for which READ is performed on the logical data arrangement of each stripe, as illustrated in FIG. 10A.

Next, the CM 12 decides the disk for which actual READ is to be performed according to the conversion table 10 in FIG. 6, based on the segments 0, 1, 2, 3 for which READ is performed on the logical data arrangement of each stripe. In FIG. 10A, the segment 0 is indicated as (stripe#0, Disk#0), and therefore, the CM 12 refers to (stripe#0, Disk#0) in the conversion table 10 in FIG. 6, where (stripe#0, Disk#0)=Disk#0. In this case, to access the segment 0 in stripe#0, the CM 12 decides Disk#0 of the same stripe#0 as the disk for which READ is to be performed, as illustrated in FIG. 10B.

Meanwhile, in FIG. 10A, the segment 1 is indicated as (stripe#0, Disk#1), and therefore, the CM 12 refers to (stripe#0, Disk#1) in the conversion table 10 in FIG. 6, where (stripe#0, Disk#1)=Disk#6. In this case, the CM 12 decides Disk#6 of the same stripe#0 as the disk for which READ is to be performed to access the segment 1 in stripe#0, as illustrated in FIG. 10B. The disk for which READ is to be performed is decided in a similar manner for the segments 2 and 3 as well.

FIG. 11A and FIG. 11B are diagrams for explaining decision of the disk for which WRITE is to be performed according to a conversion table in the embodiment. FIG. 11A illustrates a logical data arrangement example in units of a stripe before conversion according to the conversion table 10. FIG. 11B illustrates a physical data arrangement example in units of a stripe after conversion according to the conversion table 10. It is assumed that the range of the READ access from the host 24 is 0 through 512 LBA, and segments for which WRITE is performed are segments 0, 1, P0, 2, 3, P1.

The CM 12 first calculates the stripe range from the logical LBA (0 through 512 LBA) of the input/output from the host 24, and decides the segments for which WRITE is performed on the logical data arrangement of each stripe, as illustrated in FIG. 11A.

Next, the CM 12 decides the disk for which actual WRITE is to be performed according to the conversion table 10 in FIG. 6, based on the segments 0, 1, P0, 2, 3, P1 for which WRITE is performed on the logical data arrangement of each stripe. Meanwhile, in the case of WRITE, the parity also becomes the target of WRITE.

In FIG. 11A, the segment 0 is indicated as (Stripe#0, disk#0), and therefore, the CM 12 refers to (Stripe#0, disk#0) in the conversion table 10 in FIG. 6, where (Stripe#0, disk#0)=disk#0. In this case, the CM 12 decides disk#0 of the same Stripe#0 as the disk for which READ is to be performed regarding the segment 0, as illustrated in FIG. 11B.

Meanwhile, in FIG. 11A, the segment 1 is indicated as (stripe#0, Disk#1), and therefore, the CM 12 refers to (stripe#0, Disk#1) in the conversion table 10 in FIG. 6, where (stripe#0, Disk#1)=Disk#6. In this case, the CM 12 decides Disk#6 of the same stripe#0 as the disk for which READ is to be performed regarding the segment 1, as illustrated in FIG. 11B.

Meanwhile, in FIG. 11A, the segment P0 is indicated as (stripe#0, Disk#2), and therefore, the CM 12 refers to (stripe#0, Disk#2) in the conversion table 10, where (stripe#0, Disk#2)=Disk#5. In this case, the CM 12 decides Disk#5 of the same stripe#0 as the disk for which READ is to be performed regarding the segment P0, as illustrated in FIG. 11B.

Next, processes by the CM 12 according to the embodiment are explained.

Figure 12:
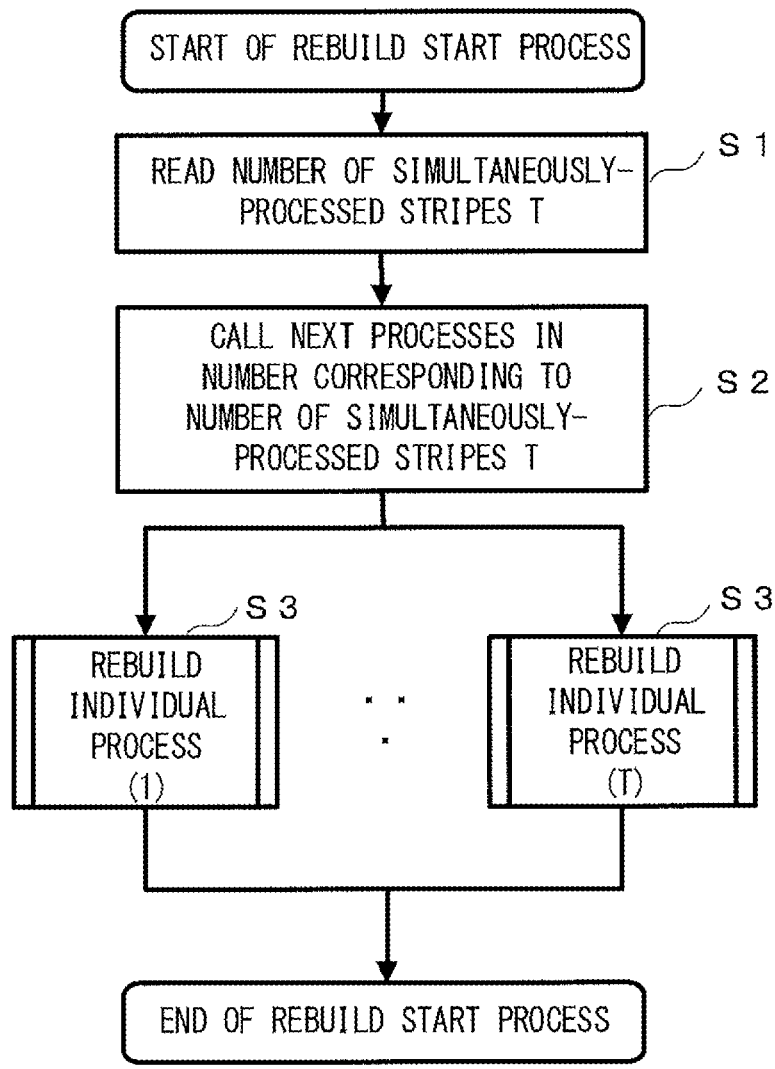
FIG. 12 illustrates a rebuild start process flow in the embodiment.

FIG. 12 illustrates a rebuild start process flow in the embodiment. When a failure occurs in one of disks that form RAID5-FR and the rebuild control unit 16 detects error information according to the failure, the rebuild control unit 16 starts a rebuild. As the start process for the rebuild, rebuild individual processes for restoring data on the failure disk in the respective stripe are started in parallel in the flow in FIG. 12.

First, the rebuild control unit 16 reads the number of simultaneously-processed stripes T which is a parameter, from the storage unit 18 of the CM 12 (S1). Here, the number of simultaneously-processed stripes T is the number of stripes to be processed in parallel at one time, which is set in advance in storage unit 18 of the CM 12.

The rebuild control unit 16 calls rebuild individual processes in the number corresponding to the number of simultaneously-processed stripes T (S2), and starts each of the rebuild individual processes (S3). The process in S3 is described in detail in FIG. 13 through FIG. 15.

As described above, independently in each of the T pieces of rebuild individual processes, the rebuild is sequentially performed by the rebuild control unit 16 in units of a stripe. For example, when the number of stripes that are the target of the rebuild is 42 and l=4, the rebuild individual processes are performed for four stripes at one time by four rebuild individual processes in parallel until all of the 42 stripes are processed.

Figure 13:
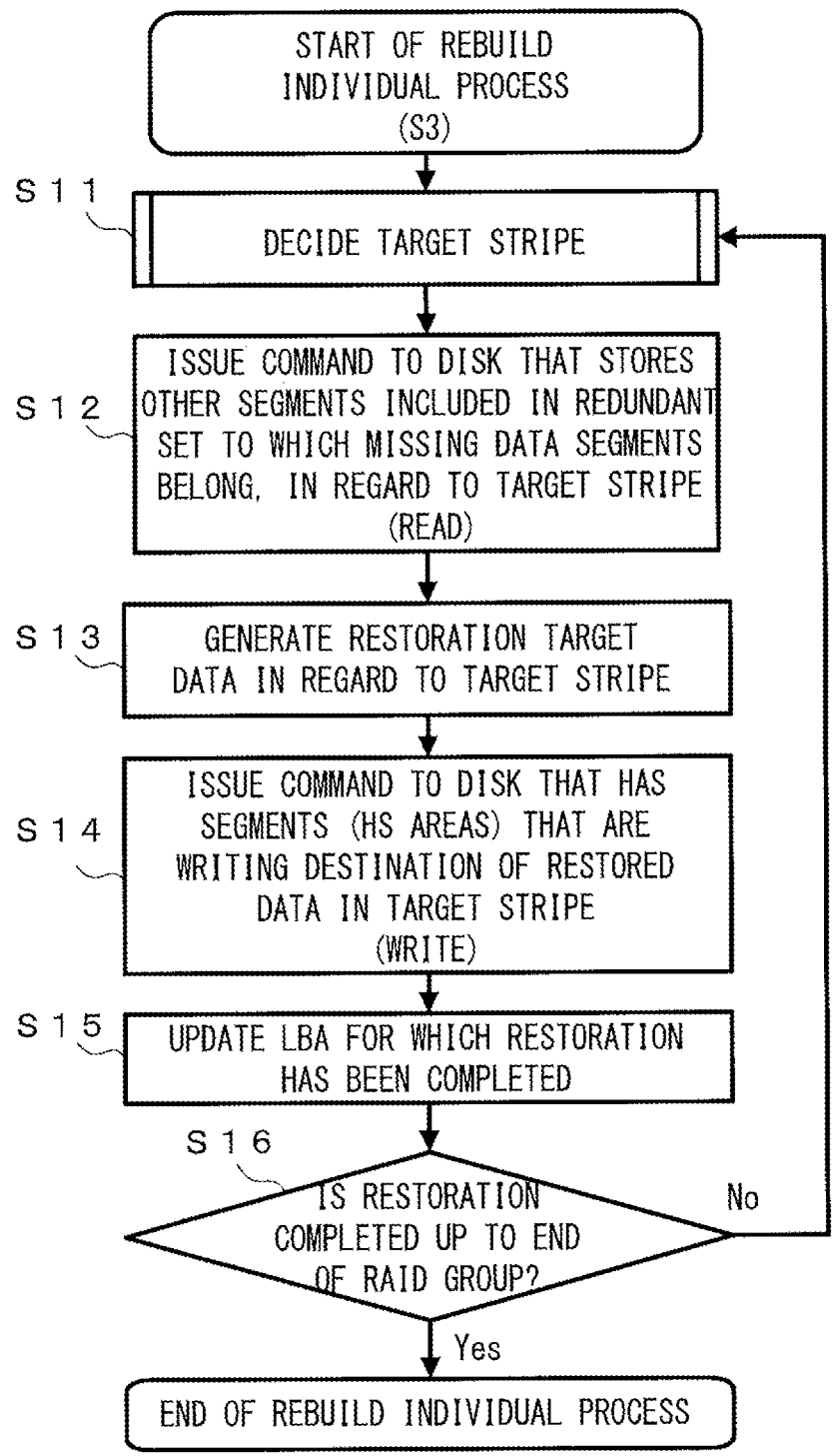
FIG. 13 illustrates the flow of a rebuild individual process (S3) in the embodiment.

FIG. 13 illustrates the flow of the rebuild individual process (S3) in the embodiment. In the rebuild individual process (S3), data restoration is performed in the following flow.

In regard to the stripe to be the target of the rebuild, the rebuild control unit 16 calculates the amount of load for each disk 22 at the current point in time, and decides one stripe in which the loads of the respective stripes are balanced as the stripe to be the actual target of the rebuild (target stripe) (S11). The process in S11 is described in detail in FIG. 15.

In regard to the target stripe, in order to restore the missing data segments, the command issue control unit 17 issues a READ command to the disk that stores other data segments included in the redundant set to which the missing data segments belong. Here, the missing data segments refer to the data segments that were stored in the failed disk. As a result, the command issue control unit 17 reads other segments included in the redundant set to which the missing data segments belong, in regard to the target stripe (S12).

The data restoration unit 15 calculates XOR of the read data segments, to generate data to be the target of restoration, regarding the target stripe (restores the missing data) (S13).

The command issue control unit 17 issues a WRITE command to the disk that has the segment (HS area) that are the writing destination of the restored data in the target stripe, and performs WRITE of the restored data into the HS area (S14).

The rebuild control unit 16 updates the LBA for which the restoration has been completed (S15).

The processes in S11 through S15 are repeated until the restoration is completed up to the end of the group 23 (S16).

In S12 through S14, in regard to the READ/WRITE processes for restoration, the rebuild control unit 16 decides the segments to be the destination of READ/WRITE according to the conversion table 10 in the same manner as for the formatting and I/O. The decision of the segments to be the destination of READ/WRITE is explained using FIG. 14A and FIG. 14B.

FIG. 14A and FIG. 14B are diagrams for explaining decision of the disk for which READ is to be performed in the case of READ for restoration according to a conversion table in the embodiment. FIG. 14A illustrates a logical data arrangement example in units of a stripe before conversion according to the conversion table 10. FIG. 14B illustrates a logical data arrangement example in units of a stripe before conversion according to the conversion table 10.

In FIG. 14B, when disk#0 fails, the data held in the failed disk#0 need to be restored. In FIG. 14B, the segments 0 and 5 were stored in disk#0, and therefore, the data in the segments 0 and 5 need to be restored.

When the target stripe is stripe#0, the segment 0, the segment 1, the segment P0 are included in the same redundant set, and therefore, the data of the segment 0 is generated by calculating XOR of the data of segment 1 and data of segment P0. Then, the CM 12 decides the disk for which actual READ is to be performed according to the conversion table 10 in FIG. 6, with respect to the segments 1 and P0 for which READ is performed on the logical data arrangement in stripe#0.

In FIG. 14A, for the segment 1 indicated as (stripe#0, Disk#1), (stripe#0, Disk#1)=Disk#6, according to the conversion table 10 in FIG. 6. Meanwhile, for the segment P0 indicated as (stripe#0, Disk#2), (stripe#0, Disk#2)=Disk#5 according to the conversion table 10. In this case, in regard to stripe#0, the CM 12 decides Disk#6 and Disk#5 in the same stripe#0 as the disks for which READ is to be performed for the segments 1 and P0 as illustrated in FIG. 14B.

In regard to stripe#0 The CM 12 restores the data of segment 0 by reading the segments 1 and P0 from the actual Disks#5, #6 and calculating XOR of the data of the segment 1 and the data of the segment P0.

Next, the CM 12 writes the restored data of the segment 0 into the HS area. In FIG. 14A, the HS area (HS0) indicated as (stripe#0, Disk#6) is (stripe#0, Disk#6)=Disk#1 according to the conversion table 10. In this case, the CM 12 decides Disk#1 of the same stripe#0 to be the disk in which the restored data are to be written, as illustrated in FIG. 14B.

Figure 15:
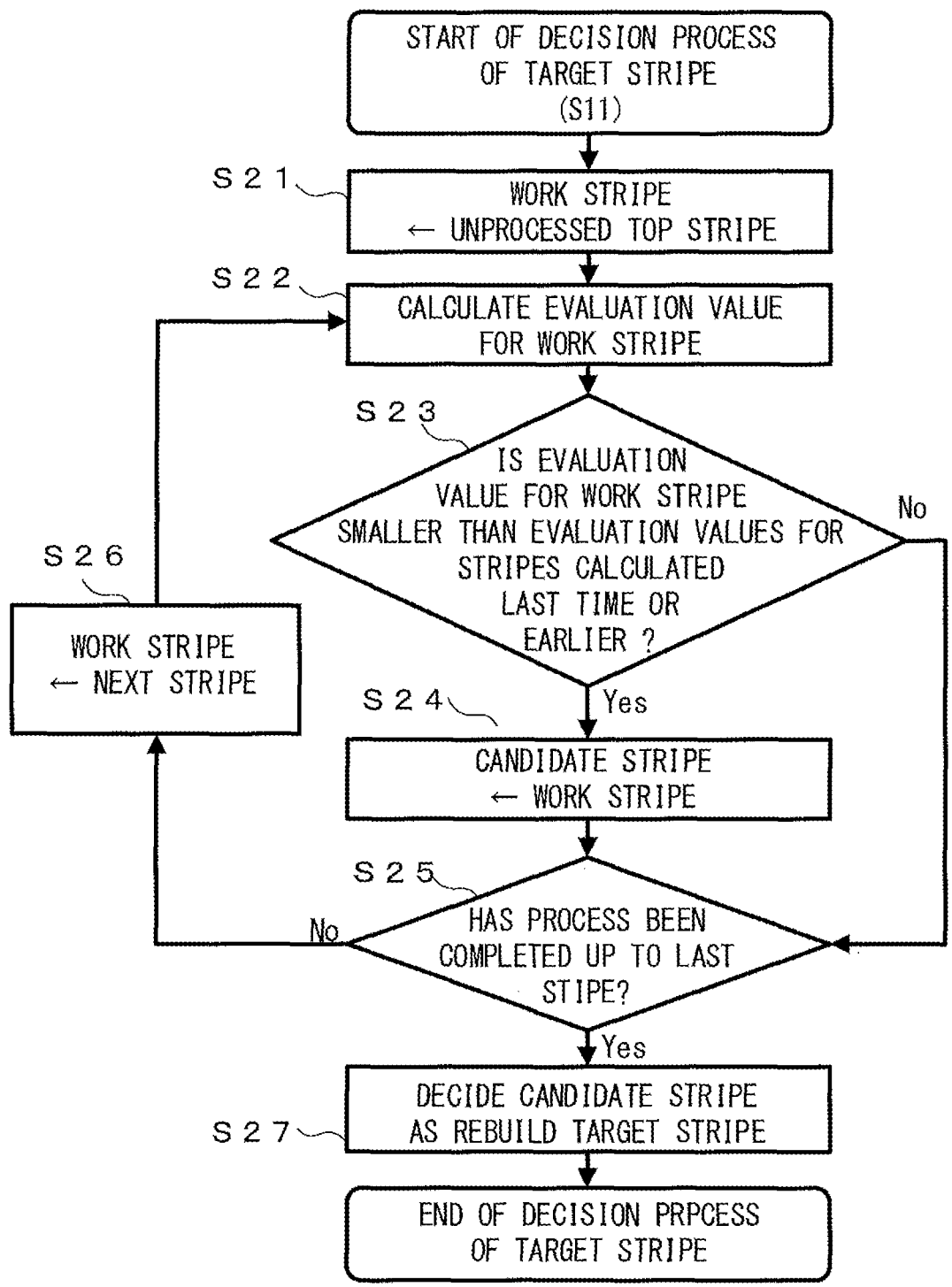
FIG. 15 illustrates the flow of a target stripe decision process (S11) in the embodiment.

FIG. 15 illustrates the flow of the target stripe decision process (S11) in the embodiment. The CM 12 decides the target stripe as follows. The CM 12 sequentially searches stripes to be the processing target, from the beginning of unprocessed stripes. The CM 12 calculates an evaluation value for the degree of distribution of the loads on disks by putting together the loads on the respective disks in accessing the searched stripes and the loads on the respective disks in other rebuild processes that are currently being performed. The CM 12 searches up to the last stripe, and selects the stripe with the lowest evaluation value as the stripe to be the rebuild target (target stripe). Meanwhile, in the embodiment, it is assumed that the smaller the evaluation value is better. FIG. 15 is described in detail.

First, the rebuild control unit 16 defines the top stripe that is unprocessed as a work stripe (S21).

The rebuild control unit 16 calculates the evaluation value for the work stripe (S22). Details of the process in S22 are explained in FIG. 16.

When the evaluation value of the work stripe calculated in S22 is lower than evaluation values of stripes calculated earlier (S23), the rebuild control unit 16 regards the work stripe as the candidate stripe (S24), and the process proceeds to the process of S25. When the evaluation value of the work stripe calculated in S22 is equal to or higher than evaluation values of stripes calculated earlier (S23, "No"), the process proceeds to the process in S25.

When the process has not been completed up to the last stripe (S25, "No"), the rebuild control unit 16 regards the stripe next to the current work stripe as the work stripe (S26), and the process in S22 is performed. The rebuild control unit 16 repeats S22 through S25 until the process is completed up to the last stripe.

When the process is completed up to the last stripe, the rebuild control unit 16 decides the candidate stripe as the rebuild target strap (S27).

Figure 16:
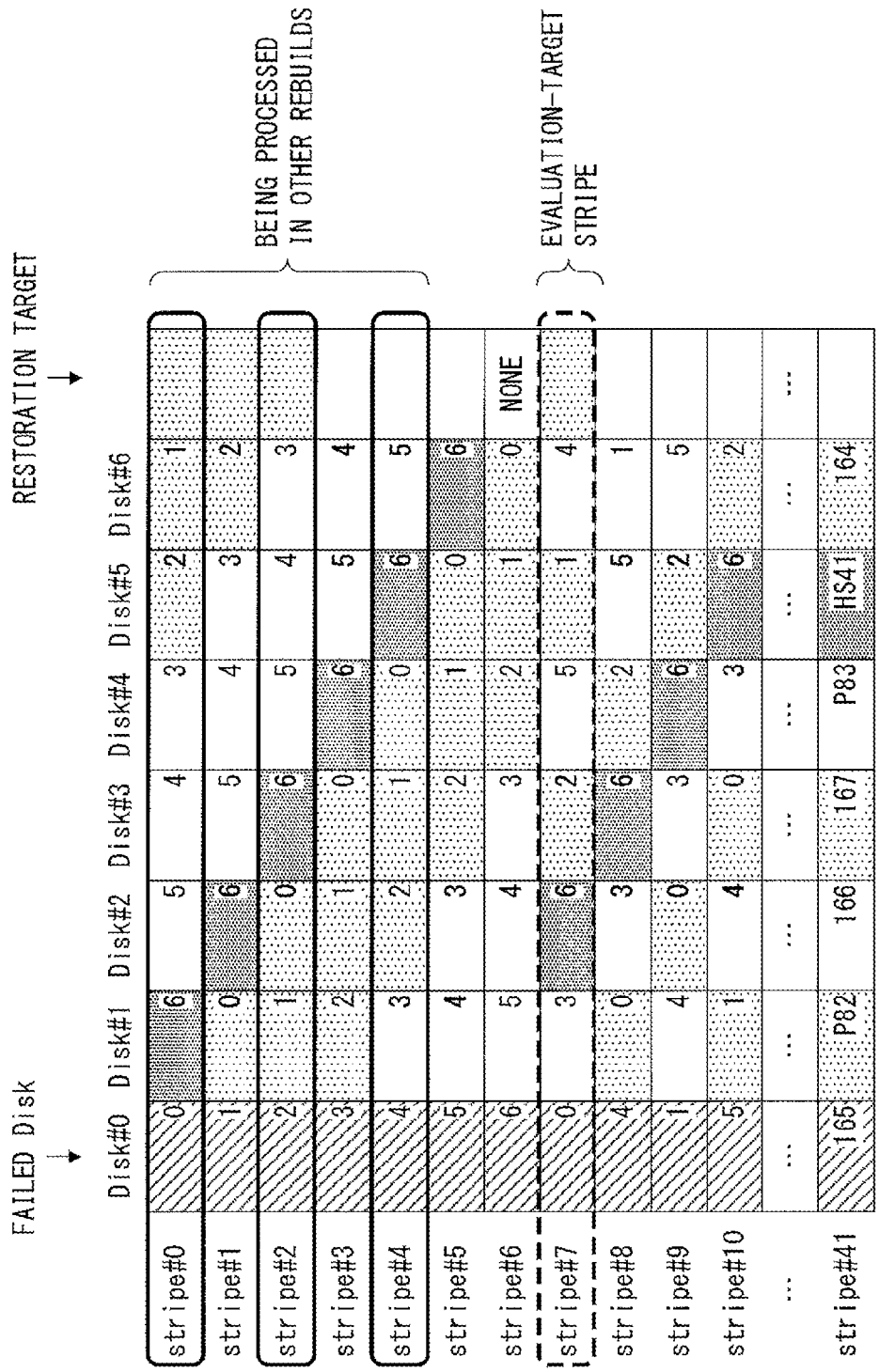
FIG. 16 is a diagram for explaining disk load judgment for a work stripe in the embodiment.

FIG. 16 is a diagram for explaining disk load judgment for work stripe in the embodiment. The evaluation value that indicates the degree of distribution of the loads on the respective disks is calculated as follows. It is assumed that segments of each stripe are arranged in a distributed manner as in FIG. 16. Meanwhile, in FIG. 16, the sell identified by the segment No. and the disk No. represents a segment, and the number in the cell is the number for identifying the segment. The segments 0 through 2, the segments 3 through 5, the segments 164, 167, P82, the segments 165, 166, P83 respectively represents the redundant set. The segment 6, HS41 represents the HS area.

The rebuild control unit 16 counts the number of READ/WRITE accesses to the respective disks #1 through #6 except the failed disk#0 for the stripes (in the thick-line frame) that have been processed in other rebuild processes and for the evaluation-target stripe (in the broken-line frame). As described above, the number of READ/WRITE accesses to the respective disks is measured by the command issue control unit 17 and stored in the storage unit 18.

Next, the rebuild control unit 16 calculates the average of the number of accesses counted for all the disks except the failed disk, using the following equation.

$$\text{Average of the number of disk accesses} = \sum_{n}^{\text{Number of disks}} \frac{\text{Number of accesses to disk \#}n}{\text{Number of disks}}$$

The rebuild control unit 16 calculates the distribution of the number of READ/WRITE accesses to all the disks except the failed disk, based on the calculated average and using the following equation, and regards the calculated distribution value as the evaluation value.

$$\text{Evaluation value} = \sum_{n}^{\text{Number of disks}} \frac{(\text{Number of accesses to disk \#}n - \text{Average of Number of disk accesses})^2}{\text{Number of disks}}$$

Regarding the distribution value, the smaller value indicates a better balance in access loads.

Meanwhile, while the distribution value is regarded as the evaluation value here, this is not a limitation, and a value calculated using another statistical method such as standard deviation may also be the evaluation value.

After the completion of writing of rebuilt data into the segment of the HS area, the failed disk is replaced. Then, the rebuild control unit 16 performs a process to write the data into a prescribed segment of the replaced disk back from the segment of the HS area (Copy back).

As described above, when performing a plurality of rebuild processes in parallel, the rebuild control unit 16 decides, for each rebuild process, the stripe for which the rebuild process is to be performed next according the access loads on the respective storage apparatuses. Accordingly, the access loads on the respective storage apparatuses are equalized and it becomes possible to speed up the rebuild.

<Distributed Arrangement by Galois Extension Field>

Next, the conversion table 10 created in advance according to the theory of Galois extension field is explained. For example, distribution of m (m: integer) RAID groups constituted by l (l: integer) member disks and n (n: integer) HSs into a set (disk pool) of k (k: integer) disks is considered.

By limiting k to a power of a prime number, the number of disks that constitute the disk becomes limited. However, by arranging data based on the theory of "Galois extension field", distributed data arrangement in disks of the RAID group is realized with a small number of patterns, namely (l−1)×(l×m+n) stripes.

(i) Galois Extension Field (when k is a Prime Number)

When the number of disks of the RAID group is a prime number, it is possible to make a distributed arrangement with a small number of patterns of stripes by deciding the data arrangement method based on Galois field. A set $\phi \in \{0, 1, 2, 3, 4\}$ of reminders of division of an integer by a prime number (5, for example) is a set (Galois field) closed under four arithmetic operations with finite elements.

For example,

4+4=8 mod 5=3∈φ

4×3=12 mod 5=2∈φ

FIG. 17A presents a table for mod (5) addition, and FIG. 17(B) illustrates a table for mod (5) integration. Here, a focus is given to the table for mod (5) addition in FIG. 17A. The column indicated as shift#n corresponds to the data arrangement for each stripe, and the line corresponds to the physical disk. Looking at each physical disk, the data arrangement mode (5) of each stripe does not overlap in any lines. That is, the data arrangement does not overlap between any shifts (stripes).

Next, a focus is given to the table for mod (5) integration in FIG. 17B. Each value in the table in FIG. 17B corresponds to shift#n. The pattern#m represents the combination of shift#n for 4 stripes. Each line corresponds to the stripe in pattern#m. Looking at the values in each line except the line "0", it is understood that the values do not overlap between any lines. That is, each column indicated as pattern#n is a different shift in the same stripe, in combinations of any patterns, except the line "0".

The data arrangement does not overlap between different shifts, and therefore, in combinations of any patterns, the data arrangement in any stripe in a pattern does not overlap with another pattern.

It is understood that it is possible to generate five exclusive patterns whose data arrangement in each stripe does not overlap with that of others, by combining the data arrangements the respective stripes in the table for mod (5) addition based on the table for mode (5) integration By extracting, from these patterns, different patterns corresponding to the number of member disks and the number of disks of HS of the RAID group and making the data arrangement for the RAID group with the extracted patterns, READ/WRITE accesses become dispersed in data establishment by the rebuild when any of the disks crashes.

Figure 18:
FIG. 18 is a diagram (2) for explaining distributed arrangement according to Galois field in the embodiment.

For example, in the case of a RAID group in which RAID5 (3+1) and one HS disk are distributed based on the tables for mod (5) addition and integration, the table in FIG. 18 is obtained. In FIG. 18, the same number represents data of the same stripe of RAID5 or the HS area for which WRITE is performed when data on the stripe break.

It is understood that, when disk#0 fails, all stripes of RAID5 and WRITE destinations of failed data are distributed without being concentrated on the same disk.

FIG. 19 is a table that expresses the table in FIG. 18 in order of data. As an example, data #0 through #3 are the unit for giving redundancy, and the area (HS area) for restoration in the case in which any of the data segments #0 through #3 fails due to a failure is Disk#1 of Stripe#16. Assuming that Disk#1 fails, data restored in the HS area is #0.

There are no problems with this as data distribution, but data in the unit for giving redundancy are not arranged on the same stripe, which is not convenient in terms of control of the rebuild with which data restoration is performed in units of a stripe. Therefore, data are rearranged in the vertical direction, to bring data in the unit for giving redundancy on the same stripe. Meanwhile, the situation of distribution of respective data into respective disks does not change with the rearrangement of data in the vertical direction.

FIG. 20 is a table as a result of rearrangement of data in the vertical direction.

The procedure for creating a table of data arrangement with respect to five disks is as described above, In addition, in regard to a set $\phi \in \{0, 1, 2, 3, k-1\}$ of reminders of division of an integer by any prime number (k), a table of distributed arrangement of disks may be create in the same manner by creating tables for addition and multiplication and combining patterns and shifts of stripes.

(ii) Galois Extension Field

While data distribution using Galois field has been described above, this system may be applied only to a disk pool with the number of disks where the number is a prime number. In order to compensate for this disadvantage, data distribution is realized in a disk pool with the number of disks where the number is a power of a prime number, by making data arrangement according to "Galois extension field".

In a disk pool, based on a set $\{0, 1, c, \alpha^2, \ldots, \alpha^{m-2}\}$ ($\in$ GF ($q^m$) q: prime number m: natural number) with the addition of an element $\alpha$, tables for addition and integration are created, and data distribution is decided based on the tables.

When primitive polynomial f ($\alpha$)=0 is established, the value of each element takes a value that circulates in a cycle m, with the same characteristics in regard to addition and multiplication as those of Galois field. As an example, in a disk pool with 4 (=$2^2$) disks, using a set $\{0, 1, \alpha, \alpha^2 (=\alpha+1)\}$ with the addition of an element $\alpha$, addition is performed as illustrated in FIG. 21A, and integration is performed as illustrated in FIG. 21B.

Primitive polynomial: $f(\alpha)=\alpha^2+\alpha+1$

When data arrangement is obtained based on the above, a table for addition is obtained as illustrated in FIG. 22A, and a table for integration is obtained as illustrated in FIG. 22B.

In regard to a power of a prime number, a table of distributed data arrangement is created by the combination of patterns and shifts of stripes using tables for addition and multiplication as well, and further, data for which redundancy is given are rearranged on the same stripe. Accordingly, it becomes possible to create a table of distributed data arrangement in the RAID group in the same manner as in the case of a prime number.

In the example above, the case of 4 (=$2^2$) disks is described, but as long as it is a power of a prime number, tables for addition and multiplication, and a table for distributed arrangement of disks may be created with respect to an appropriate primitive polynomial.

According to the embodiment, one or more redundant sets (RAID) and an HS area are distributed in to the respective stripes with respect to the RAID group. Accordingly, the rebuild time is reduced by realizing a throughput for the rebuild that exceeds the throughput for one disk.

In addition, it becomes possible to make distributed data arrangement with which access loads on respective disks at the time of data restoration by a rebuild become even, when distributing the redundant sets and the HS area. Accordingly, it becomes possible to efficiently use the throughput of each disk, and the rebuild time is reduced.

In addition, in the distributed data arrangement, with each rebuild process, the stripe for which the rebuild process is to be performed next may be dynamically decided so that disk access loads become even. Accordingly, the rebuild time is reduced, because the throughput of the disk may be improved and each disk may be efficiently used.

According to an aspect of the embodiment, in a storage system in which data are stored in a distributed manner into a group of storage apparatuses, it becomes possible to speedup the rebuilding process in a case in which a plurality of rebuilding process for data are executed.

Meanwhile, the embodiment is not limited to the embodiment described above, and may take various configurations or embodiments without departing from the scope and spirit of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising
a processor that performs a process including:
in a group of storage apparatuses that store constituent data that constitute redundant data in a distributed manner in units of a stripe that is a unit in which the constituent data are stored in parallel in respective storage apparatuses of the group of storage apparatuses, in regard to respective stripes of a plurality of stripes obtained from a group of target storage apparatuses excluding one of the storage apparatuses, starting a plurality of rebuilding processes for restoring the constituent data;
for each rebuilding process, deciding a stripe for which the rebuilding process is to be performed next, according to access loads on the respective storage apparatuses of the group of target storage apparatuses; and
for the respective rebuilding processes, obtaining constituent data corresponding to the decided stripe from the group of target storage apparatuses and executing the rebuilding process, to restore constituent data stored in the excluded storage apparatus from the obtained constituent data.

2. The storage control apparatus according to claim 1, wherein
the deciding decides, for the respective rebuilding processes, a stripe for which the rebuilding process is to be performed next according to access loads on the respective storage apparatuses calculated based on a number of accesses to the respective storage apparatuses of the group of target storage apparatuses.

3. The storage control apparatus according to claim 2, wherein
the deciding calculates, for each rebuilding process, a distribution value or a standard deviation of a number of accesses to the group of target storage apparatuses based on a number of accesses to the respective storage apparatuses included in the group of target storage apparatuses, and decides a stripe for which the rebuilding process is to be performed next according to the distribution value or the standard deviation.

4. The storage control apparatus according to claim 1, wherein
the respective storage apparatuses include a first area for storing the constituent data corresponding to the stripe or a second area used when restoring the redundant data corresponding to the stripe; and
the first area and the second area are held by the respective storage apparatuses of the group of storage apparatuses in a distributed manner into respective stripes, according to storage destination identification information that identifies a storage apparatus for actual storage from a logical combination of the stripe and the storage apparatus.

5. The storage control apparatus according to claim 4, wherein
the storage destination identification information is created based on Galois theory or Galois extension theory.

6. A non-transitory computer-readable recording medium having stored therein a program for causing a computer to execute a control process for a storage apparatus, the process comprising:
in a group of storage apparatuses that store constituent data that constitute redundant data in a distributed manner in units of a stripe that is a unit in which the constituent data are stored in parallel in respective storage apparatuses of the group of storage apparatuses, in regard to respective stripes of a plurality of stripes obtained from a group of target storage apparatuses excluding one of the storage apparatuses, starting a plurality of rebuilding processes for restoring the constituent data;
for each rebuilding process, deciding a stripe for which the rebuilding process is to be performed next, according to access loads on the respective storage apparatuses of the group of target storage apparatuses; and
for the respective rebuilding processes, obtaining constituent data corresponding to the decided stripe from the group of target storage apparatuses and executing the rebuilding process, to restore constituent data stored in the excluded storage apparatus from the obtained constituent data.

7. The non-transitory computer-readable recording medium according to claim 6, wherein
the deciding decides, for the respective rebuilding processes, a stripe for which the rebuilding process is to be performed next according to access loads on the respective storage apparatuses calculated based on a number of accesses to the respective storage apparatuses of the group of target storage apparatuses.

8. The non-transitory computer-readable recording medium according to claim 7, wherein
the deciding calculates, for each rebuilding process, a distribution value or a standard deviation of a number of accesses to the group of target storage apparatuses based on a number of accesses to the respective storage apparatuses included in the group of target storage apparatuses, and decides a stripe for which the rebuilding process is to be performed next according to the distribution value or the standard deviation.

9. The non-transitory computer-readable recording medium according to claim 6, wherein
the respective storage apparatuses include a first area for storing the constituent data corresponding to the stripe or a second area used when restoring the redundant data corresponding to the stripe; and
the first area and the second area are held by the respective storage apparatuses of the group of storage apparatuses in a distributed manner into respective stripes, according to storage destination identification information that identifies a storage apparatus for actual storage from a logical combination of the stripe and the storage apparatus.

10. The non-transitory computer-readable recording medium according to claim 9, wherein
the storage destination identification information is created based on Galois theory or Galois extension theory.

11. A storage control method comprising:
in a group of storage apparatuses that store constituent data that constitute redundant data in a distributed manner in units of a stripe that is a unit in which the constituent data are stored in parallel in respective storage apparatuses of the group of storage apparatuses, in regard to respective stripes of a plurality of stripes obtained from a group of target storage apparatuses excluding one of the storage apparatuses, starting a plurality of rebuilding processes for restoring the constituent data by using a computer;
for each rebuilding process, deciding a stripe for which the rebuilding process is to be performed next, according to access loads on the respective storage apparatuses of the group of target storage apparatuses by using a computer; and
for the respective rebuilding processes, obtaining constituent data corresponding to the decided stripe from the group of target storage apparatuses and executing the rebuilding process, to restore constituent data stored in the excluded storage apparatus from the obtained constituent data by using a computer.

12. The storage control method according to claim 11, wherein
the deciding decides, for the respective rebuilding processes, a stripe for which the rebuilding process is to be performed next according to access loads on the respective storage apparatuses calculated based on a number of accesses to the respective storage apparatuses of the group of target storage apparatuses.

13. The storage control method according to claim 12, wherein
the deciding calculates, for each rebuilding process, a distribution value or a standard deviation of a number of accesses to the group of target storage apparatuses based on a number of accesses to the respective storage apparatuses included in the group of target storage apparatuses, and decides a stripe for which the rebuilding process is to be performed next according to the distribution value or the standard deviation.

14. The storage control method according to claim 11, wherein the respective storage apparatuses include a first area for storing the constituent data corresponding to the stripe or a second area used when restoring the redundant data corresponding to the stripe; and
the first area and the second area are held by the respective storage apparatuses of the group of storage apparatuses in a distributed manner into respective stripes, according to storage destination identification information that identifies a storage apparatus for actual storage from a logical combination of the stripe and the storage apparatus.

15. The storage control method according to claim 14, wherein
the storage destination identification information is created based on Galois theory or Galois extension theory.

* * * * *